Figure 1:
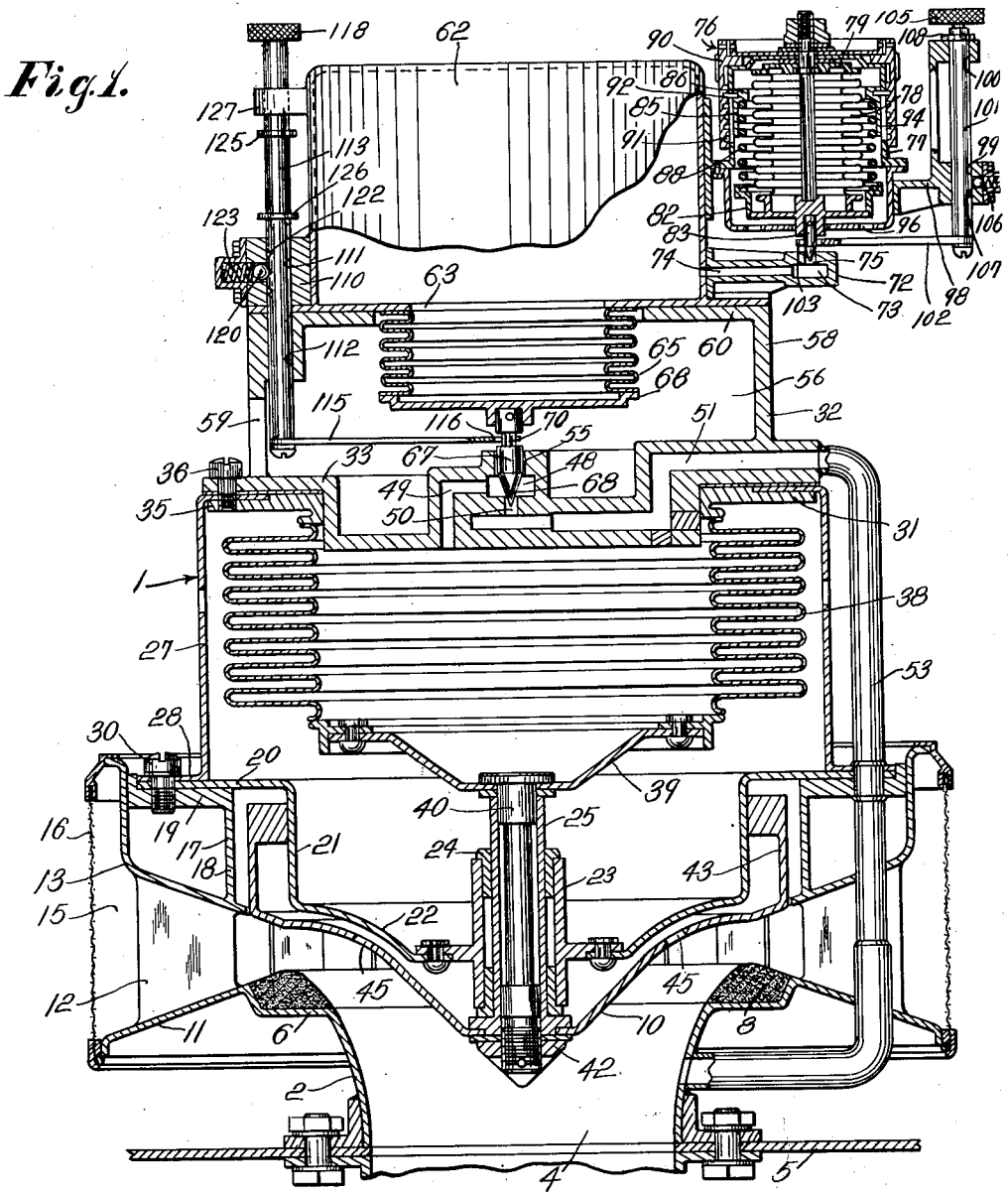

July 26, 1949.  W. W. PAGET  2,477,005
PRESSURE REGULATOR
Filed May 3, 1945

Inventor:
Win W. Paget.
by Lewis H. Maxson
att'y.

Patented July 26, 1949

2,477,005

UNITED STATES PATENT OFFICE

2,477,005

PRESSURE REGULATOR

Win W. Paget, Michigan City, Ind., assignor to Joy Manufacturing Company, a corporation of Pennsylvania Application May 3, 1945, Serial No. 591,704

22 Claims. (Cl. 98—1.5)

My invention relates to pressure regulating valve mechanisms, and more particularly to valve mechanisms which operate automatically to regulate the pressures in the cabin of an aircraft.

It is desirable that the pressure changes in the cabin of an aircraft be controlled as the elevation of flight varies, and that predetermined pressures be maintained when flying at high altitudes. As the aircraft takes off from a landing field and gains altitude, the pressure within its cabin may be permitted to drop until it is equal to the ambient pressure at a predetermined altitude, for example, 8000 ft. It is desirable that the rate of pressure drop in the cabin to the value at the 8000 ft. elevation be limited, however, to some predetermined value. If the rate of climb is such that the exterior pressure drops at a rate slower than this, then the cabin pressure may be permitted to drop at the same rate as the exterior pressure. When the cabin pressure becomes equal to the ambient pressure at the 8000 ft. elevation, the pressure within the cabin is desirably maintained constant as the exterior pressure continues to drop with further increase in elevation of flight. It is also desirable that the cabin pressures be prevented from increasing above a predetermined rate when the aircraft descends to landing fields at elevations below 8000 ft. Specifically it is desirable to be able to raise the cabin pressure when the aircraft is approaching a landing field, in such a manner that the rate of pressure rise may be held below a predetermined maximum.

A preferred form of my invention may include a valve member which is movable relative to a vent port in the cabin of an aircraft for controlling the venting of air supplied to the latter by a suitable supercharger. Such a valve member may be operatively connected to a pressure responsive device which is adapted to be subjected on a movable surface thereof to the pressures either at the exterior or interior of the cabin under the control of a pilot valve, so that when such surface of the pressure responsive device is subjected to the pressure at the exterior of the cabin, the valve member assumes an open position connecting the cabin to the surrounding atmosphere and when such surface of the pressure responsive device is subjected to cabin pressure, the valve member moves to its closed position cutting off communication between the cabin and the exterior thereof. The pilot valve may desirably be connected to a pressure responsive device which operates in response to the difference between cabin pressure and the pressure within a tank. Passage means may desirably be provided for connecting the tank in communication with the cabin, and a valve element operatively connected to an evacuated bellows may desirably control communication between the tank and the cabin through the passage means. When the valve element is in its open position, only a restricted communication is obtained between the tank and the cabin, in a preferred embodiment of the invention. Associated with the valve element will be means for moving it to and holding it in its open position when desired. The control of the valve element by the evacuated bellows, when the valve element is free to move, will be made such as to effect a regulation of the vent valve for maintaining the cabin pressure equal to the pressure at 8000 ft. when the pressure in the cabin reaches that value. Associated with the pilot valve there will be means which is adjustable manually for yieldably urging the pilot valve toward its open or closed positions.

An object of my invention is to provide an improved valve mechanism for controlling the pressures in the cabin of an aircraft. Another object is to provide an improved valve mechanism which is operative to limit the rate of pressure drop in the cabin of an aircraft during ascent of the latter. Still another object is to provide an improved valve mechanism which is operative to effect a pressure drop in the cabin of an aircraft at a predetermined rate, during ascent of the aircraft, until a predetermined low pressure is reached, and which operates to maintain the cabin pressures constant at the predetermined low pressure while the pressure at the exterior of the cabin drops to some lower value. Yet another object is to provide an improved valve mechanism which is operative to effect an increase in the cabin pressure at a predetermined rate as long as the pressure at the exterior of the cabin is below cabin pressure. Another object of my invention is to provide an improved valve mechanism for controlling the rate of pressure change in the cabin of an aircraft during both the ascent and descent of the latter. Another object is to provide an improved valve mechanism which is operative to effect an increase in the cabin pressure at a predetermined rate during flight at any elevation. These and other objects of my invention will appear more fully in the course of the following description.

In the accompanying drawing in which there is shown one illustrative embodiment which my invention may assume in practice:

Fig. 1 is a vertical sectional view showing my improved valve mechanism in its preferred form.

In the illustrative embodiment of the invention there is shown a valve mechanism generally designated 1 for controlling communication between the cabin of an aircraft and the exterior of the latter. This valve mechanism is shown herein as comprising an annular member 2 supported by a collar 3 in communication with a port 4 formed in the wall 5 of an aircraft. The annular member 2 is provided with a portion 6 which supports a seat providing member 8 in a position to be engaged by a valve member 10 for cutting off communication between the interior and exterior of the cabin through the port 4. Extending outwardly from the portion 6 is a flared portion 11 supporting ribs 12 which carry another flared portion 13 forming with the portion 11 an annular passage 15 which opens into the interior of the cabin. Secured between the portions 11 and 13 is a screen 16 which operates to prevent foreign matter from gaining admission to the passage 15. Arranged above the flared portion 13 is a member 17 having a vertical wall portion 18 and a horizontal wall portion 19, the wall portions 18 and 19 being connected to the portion 13, as by welding. Resting upon the wall portion 19 is a member 20 having a depending circular wall portion 21 and a lower inwardly projecting wall portion 22. Suitably connected to the wall portion 22 is a sleeve-shaped member 23 carrying bushings 24 which slidably receive a tubular member 25.

Arranged in axial alinement with the port 4 is a casing 27 having a flange portion 28 at its lower end resting upon the member 20. The flange portion 28 and the member 20 are connected to the wall portion 19 of the member 17, as by screws 30. The upper end of the casing 27 is provided with an inwardly projecting flange portion 31 which supports a member 32 having a wall portion 33 which closes the upper end of the casing 27. Arranged beneath the flange portion 31 is an annular member 35, and the members 35 and 32 are clamped to the flange portion 31 as by screws 36. Arranged within the casing 27 is a bellows device 38 which is connected at its upper end, as by brazing, to the annular member 35 and which is connected at its lower end in a similar manner to a closure plate 39. A bolt 40 projects through an opening in the closure plate 39 and extends through the tubular member 25 and through an opening in the valve member 10. A nut 42 threaded upon the lower end of the bolt 40 clamps the valve member 10 to the tubular member 25 for movement therewith. The valve member 10 is provided at its outer edge with an upwardly projecting portion 43 which slidably engages the wall portion 21. It will be seen that movement of the valve member relative to its seat is guided by the bushings 24 engaging the tubular member 25 and by the valve portions 43 engaging the wall portions 21. Ports 45 formed in the valve member 10 connect the spaces at its opposite sides in communication so that the pressures upon the valve member are balanced. Formed in the wall portion 33 of the member 32 is a chamber 48 which is connected by a passage 49 in communication with the interior of the bellows device 38. A port 50 opens from the chamber 48 into a passage 51 which is connected to a conduit 53 opening through a wall of the annular member 2 at a point where the pressures are always equal to the pressures at the exterior of the cabin. The chamber 48 also opens through a port 55 into a chamber 56 above the wall portion 33. The member 32 is provided with an upwardly projecting wall portion 58 bounding the sides of the chamber 56, and opening through this wall portion is a port 59 connecting the chamber 56 in communication with the cabin. At the upper edge of the wall portion 58 is an inwardly projecting flange portion 60 upon which there is arranged a tank 62 having an opening 63 in its wall adjacent the chamber 56, and connected to the tank 62 around the opening 63 is a bellows device 65 which is connected at its lower end, as by brazing, to a closure plate 66. Projecting through the port 55 into the chamber 48 is a valve element or pilot valve 67 having a tapered portion 68 which cooperates with the port 50 for controlling communication between the chamber 48 and the passage 51. The pilot valve 67 is of such size that a clearance is provided between it and the wall of the port 55 so as to connect the chamber 48 continuously in communication with the chamber 56. The maximum flow rate around the valve stem will be less than the potential flow rate through the port 50, passage 51 and conduit 53. An upwardly projecting stem 70 on the pilot valve is connected by suitable means to the closure plate 66.

Connected to the side of the tank 62, as by welding, is a member 72 having a chamber 73 which is connected by a passage 74 in communication with the interior of the tank. A port 75 connects the chamber 73 in communication with the cabin under the control of a valve mechanism generally designated 76. The valve mechanism 76 comprises a valve casing 77 which is connected to the side of the tank 62, as by welding. Arranged within the valve casing is a bellows device 78 which is connected at its upper end to a plate 79 clamped by suitable means to the upper end of the casing. The lower end of the bellows device 78 is connected to a plate member 82, and a valve element 83 operatively connected to the plate member 82 cooperates with the port 75 for controlling communication between the chamber 73 and the cabin. Arranged within the valve casing 77 is an annular member 85 having an inwardly projecting flanged portion 86, and a spring 88 acts between the flanged portion 86 and the plate member 82 for urging the latter in a direction to move the valve element toward the port 75. Surrounding the valve casing 77 is a sleeve-shaped member 90 having a helical groove 91 in its inner surface, and pins 92 carried by the annular member 85 project through elongated slots 94 in the valve casing into the helical groove 91. It will be seen that a rotation of the sleeve-shaped member 86 will cause the pins 92 to follow in the helical groove 91 and effect an adjustment of the annular member 85 for varying the compression of the spring 88. The sleeve-shaped member 90 is held against movement axially of the valve casing but is rotatably supported on the valve casing, and suitable means may be provided for holding it in any of its adjusted positions. The interior of the bellows device 78 is evacuated, and the pressure of the spring 88 is adjusted so that the bellows device 78 will be extended only when the pressure on its exterior drops to a value equal to that at which it is desired that the pressure within the cabin be maintained constant. Ports 96 formed in the valve casing connect the space surrounding the bellows device 78 in communication with the interior of the cabin. Connected to the side of the valve casing in any suitable manner is a frame 98 having alined openings 99 and 100 which slidably guide an elongated member 101. Connected to the lower end of the member 101 is an arm 102 having a forked portion 103 which straddles the valve element 83 and is adapted to engage a projecting portion of the closure plate 82 for pressing the valve element 83 away from the port 75. The upper end of the member 101 is provided with a portion 105 which may be grasped by an operator for moving the member 101 into its different positions. Supported by the frame 98 is a spring pressed ball 106 which is receivable in a notch 107 in the member 101 for holding the latter in its upper position—the one in which it is adapted to coact with the projecting portion of the plate 82. An enlarged portion 108 on the member 101 is engageable with the upper end of the frame 98 for limiting movement of the member 101 in a direction to release the valve element 83.

Attached to a side of the tank 62 is a block 110 having an opening 111 in alinement with an opening 112 in the member 32, and a rod 113 is slidably received within the openings 111 and 112 and extends into the chamber 56. Attached to the lower end of the rod 113 is a spring arm 115 having a forked portion 116 straddling the valve stem 70 and engageable with an enlarged head portion of the latter and with the pilot valve portion 67 for urging the latter away from or toward the port 50. The upper end of the rod 113 is provided with a portion 118 which may be grasped by an operator for adjusting the rod longitudinally. Received within an opening in the block 110 is a ball 120 which is adapted to project into notches 122 in the rod 113 for holding the latter in its various adjusted positions. A spring 123 acting against the ball 120 yieldingly holds the latter in engagement with the rod 113. Fixed to the rod 113 are members 125 and 126, the member 125 being engageable with a flange portion 127 on the tank for limiting upward movement of the rod 113 to a position in which the ball 120 is received within the lower one of the notches 122, and the member 126 being engageable with the block 110 for limiting movement of the rod 113 in a downward direction to a position in which the ball 120 is received within the upper one of the notches 122. It will be observed that the construction is such that the forces exerted by the spring arm 115 in its opposite pilot valve-biasing positions are unaffected by altitude changes.

The operation of the valve mechanism described above is as follows: While the aircraft is standing idly on the landing field, the pressures at opposite sides of the bellows device 38 are the same and the valve member 10 is held in engagement with the seat providing member 8, cutting off communication between the interior and exterior of the cabin. The evacuated bellows 78 will be compressed by cabin pressure acting against its exterior, and will hold the valve element 83 away from the port 75. The tank 62 then communicates through the passage 74, the chamber 73 and the port 75 with the interior of the cabin, and the pressure within the tank acting on the interior of the bellows device 65 is the same as the pressure acting on the exterior of the latter. The bellows device 65 may then hold the pilot valve 67 in either its open or closed positions. Before the plane takes off, however, the rod 113 is lifted by the operator so that the spring arm 115 acts on the pilot valve 67 and holds the bellows device 65 slightly compressed, the pilot valve at this time being spaced from the port 50 so as to provide communication between the chamber 48 and the passage 51. If the engines of the aircraft are now started and air is supplied to the interior of the cabin, the pressure within the cabin will rise. As soon as the pressure within the cabin exceeds by a very small amount the pressure at the exterior of the latter, the bellows device 38 will be compressed and cause the valve member 10 to be unseated. As the plane takes off from the airfield and gains altitude, the pressure at the exterior of the cabin drops. The pressure within the cabin tends to drop at the same rate, but continues to maintain a slight differential in pressure between the cabin and its exterior. With the valve element 83 in its open position, the pressure in the tank drops at a slow rate by reason of the restricted communication between the tank and the cabin. If the pressure within the cabin decreases rapidly because of a rapid ascent of the plane, then the pressure within the tank soon exceeds the pressure within the cabin and the bellows device 65 is extended to seat the pilot valve 67 cutting off communication between the chamber 48 and the passage 51. When this happens, the cabin pressure conducted through the space between the valve member 67 and the wall of the port 55, the chamber 48 and the passage 49 to the interior of the bellows device 38 causes the latter to expand and seat the valve member 10. The pressure within the cabin then increases until the pressures within the tank and the cabin become near enough to each other so that the spring arm 115 moves the pilot valve 67 again to its open position connecting the interior of the bellows device 38 to the exterior of the cabin. The cabin pressure then drops until it is below the pressure in the tank enough to cause the bellows device 65 to expand again and seat the pilot valve 67. It will be seen that the valve member 10 will operate under the control of the valve member 67 to limit the rate of decrease in cabin pressure to the rate at which the pressure change within the tank 62 takes place. If the plane continues to ascend and the pressure within the cabin eventually drops to a value equal to that at the 8000 ft. elevation, the bellows device 78 will be expanded by the spring 88 and seat the valve element 83 to cut off communication between the interior of the tank and the cabin. If the cabin pressure then varies from the pressure in the tank, the bellows device 65 operates to regulate the pilot valve 67 and control communication between the cabin and its exterior to effect an adjustment of the valve member 10 in a manner to maintain the pressure within the cabin constant. Assuming that the plane is flying at an elevation substantially above 8000 ft., an elevation such as 30,000 ft., and it is desired to descend to an airfield, the operator may grasp the portion 105 of the member 101 and lift the latter to force the valve element 83 away from the port 75. The operator also grasps the portion 118 of the rod 113 and moves the latter downwardly to a position in which the spring arm 115 acts against the valve member 67 to urge the latter toward the port 50 for cutting off communication between the chamber 48 and the passage 51. With the valve member 67 held seated by the spring arm 115, the interior of the bellows device 38 will be subjected to cabin pressure and will operate to hold the valve member 10 seated. It will be seen that under these conditions the pressure within the cabin will increase, and the pressure within the tank will also increase at a predetermined rate. If the cabin pressure increases more rapidly than the tank pressure, the pressure at the exterior of the bellows device 65 will exceed that at the interior of the tank, and when this pressure differential becomes high enough to overcome the action of the spring arm 115, the pilot valve 67 will be unseated and connect the interior of the bellows device 38 in communication with the exterior of the cabin. This results in an opening of the valve member 10 and a reduction of cabin pressure. The increase in cabin pressure may take place while the plane continues to fly at a given elevation or while it is descending. Regardless of the rate of descent of the plane, the pressure within the cabin will increase only at a rate equal to the rate of pressure increase within the tank. By the time the plane has descended to the elevation of 8000 ft., the pressure within the cabin will have increased to some value above that at the 8000 ft. elevation, but its amount of increase will not be as great as was the increase in pressure at the exterior of the cabin. As the plane drops below the 8000 ft. elevation, the pressure at the exterior of the cabin continues to increase more rapidly than the pressure within the cabin. The rate of pressure change in the cabin and the time of starting the descent may be so determined that the cabin pressure becomes equal to the pressure at its exterior when the plane has descended to approximately the elevation of the landing field. When the plane has dropped to an elevation at which the exterior pressure equals the cabin pressure, an opening of the valve 67 results in the subjection of the interior of the bellows device 38 to a pressure equal to the cabin pressure and the valve 10 remains closed. The supply of air to the cabin by the supercharger is great enough, however, to increase the cabin pressure at a greater rate than the increase in exterior pressure, and, as soon as the cabin pressure exceeds the exterior pressure by a small amount, the valve 10 opens and vents cabin air to atmosphere. Further descent of the plane results in an increase in cabin pressure at the same rate as exterior pressure, the cabin pressure during this time being slightly greater than exterior pressure.

As a result of my invention there is provided an improved valve mechanism for regulating the pressures in the cabin of an aircraft. The valve mechanism may be adjusted in a manner to operate automatically so that the pressure in the cabin drops at a predetermined rate as the aircraft climbs to a predetermined elevation. Above this elevation, the valve mechanism operates to maintain a constant cabin pressure. The valve mechanism may also be adjusted to effect an increase in cabin pressure at a controlled rate while flying at any elevation, or while the elevation of flight is varying and the pressure at the exterior of the cabin is lower than that at its interior.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim as new and desire to secure by Letters Patent is:

1. A valve mechanism for controlling the pressures in the cabin of an aircraft to which air is supplied continuously comprising, in combination, a valve member for controlling communication between the cabin and the exterior of the latter, a pressure responsive device having oppositely directed pressure areas for controlling said valve member, means for subjecting one of said pressure areas to cabin pressures, means for connecting the space adjacent the other of said pressure areas in communication with the cabin, passage means for connecting the space adjacent said other pressure area in communication with the exterior of the cabin, means including a valve element movable to open and closed positions for controlling communication through said passage means, a pressure responsive device having oppositely directed like pressure areas for controlling said valve element and for imposing on the latter, when said like pressure areas are subjected to like fluid pressures, a force in a closing direction, means for subjecting one of said like pressure areas of said last mentioned pressure responsive device to cabin pressure, means associated with the other of said like pressure areas of said last mentioned pressure responsive device for forming a chamber of substantial volume in communication therewith, means for connecting said chamber and said other like pressure area of said last mentioned pressure responsive device in restricted communication with the cabin, and means, having a control element movable at the will of an operator, for resiliently imposing on said valve element another force, unaffected by flight altitude, biasing said valve element in one direction.

2. A valve mechanism for controlling the pressures in the cabin of an aircraft to which air is supplied continuously comprising, in combination, a valve member for controlling communication between the cabin and the exterior of the latter, a pressure responsive device having oppositely directed pressure areas for controlling said valve member, means for subjecting one of said pressure areas to cabin pressures, means for connecting the space adjacent the other of said pressure areas in communication with the cabin, passage means for connecting the space adjacent said other pressure area in communication with the exterior of the cabin, means including a valve element movable to open and closed positions for controlling communication through said passage means, a pressure responsive device having oppositely directed pressure areas for controlling said valve element, means for subjecting one pressure area of said last mentioned pressure responsive device to cabin pressure, means for connecting the other pressure area of said last mentioned pressure responsive device in restricted communication with the cabin, and means for controlling communication through said last mentioned means, said controlling means including an evacuated bellows subjected to cabin pressure and having a valve member operatively connected thereto.

3. A valve mechanism for controlling the pressures in the cabin of an aircraft to which air is supplied continuously comprising, in combination, a valve member for controlling communication between the cabin and the exterior of the latter, a pressure responsive device having oppositely directed pressure areas for controlling said valve member, means for subjecting one of said pressure areas to cabin pressures, means for connecting the space adjacent the other of said pressure areas in communication with the cabin, passage means for connecting the space adjacent said other pressure area in communication with the exterior of the cabin, means including a valve element movable to open and closed positions for controlling communication through said passage means, a pressure responsive device having oppositely directed pressure areas for controlling said valve element, means for subjecting one pressure area of said last mentioned pressure responsive device to cabin pressure, means for connecting the other pressure area of said last mentioned pressure responsive device in restricted communication with the cabin, means including a valve member movable to open and closed positions for controlling communication through said last mentioned means, an evacuated bellows subjected to cabin pressure and operatively connected to said last mentioned valve member for controlling the latter, and means for moving said last mentioned valve member to and holding it in its open position when desired.

4. A valve mechanism for controlling the pressures in the cabin of an aircraft to which air is supplied continuously comprising, in combination, a valve member for controlling communication between the cabin and the exterior of the latter, a pressure responsive device having oppositely directed pressure areas for controlling said valve member, means for subjecting one of said pressure areas to cabin pressures, means for connecting the space adjacent the other of said pressure areas in communication with the cabin, passage means for connecting the space adjacent said other pressure area in communication with the exterior of the cabin, means including a valve element movable to open and closed positions for controlling communication through said passage means, a pressure responsive device having oppositely directed like pressure areas for controlling said valve element, means for subjecting one of said like pressure areas of said last mentioned pressure responsive device to cabin pressure, means associated with the other of said like pressure areas of said last mentioned pressure responsive device for forming a chamber of substantial volume in communication therewith, means for connecting said chamber and said other like pressure area of said last mentioned pressure responsive device in restricted communication with the cabin, and means, having a control element movable at the will of an operator, for yieldingly urging said valve element toward its open position whereby the same is maintained open when said like pressure areas are subjected to like fluid pressures.

5. A valve mechanism for controlling the pressures in the cabin of an aircraft to which air is supplied continuously comprising, in combination, a valve member for controlling communication between the cabin and the exterior of the latter, a pressure responsive device having oppositely directed pressure areas for controlling said valve member, means for subjecting one of said pressure areas to cabin pressures, means for connecting the space adjacent the other of said pressure areas in communication with the cabin, passage means for connecting the space adjacent said other pressure area in communication with the exterior of the cabin, means including a valve element movable to open and closed positions for controlling communication through said passage means, means for yieldingly urging said valve element toward its open position, a pressure responsive device having oppositely directed pressure areas for controlling said valve element, means subjecting one pressure area of said last mentioned pressure responsive device to cabin pressure for urging said valve element toward its open position, means for connecting the other pressure area of said last mentioned pressure responsive device in restricted communication with the cabin, and means for controlling communication through said last mentioned means, said controlling means including an evacuated bellows subjected to cabin pressure and having a valve member operatively connected thereto.

6. A valve mechanism for controlling the pressures in the cabin of an aircraft to which air is supplied continuously comprising, in combination, a valve member for controlling communication between the cabin and the exterior of the latter, a pressure responsive device having oppositely directed pressure areas for controlling said valve member, means for subjecting one of said pressure areas to cabin pressures, means for connecting the space adjacent the other of said pressure areas in communication with the cabin, passage means for connecting the space adjacent said other pressure area in communication with the exterior of the cabin, means including a valve element movable to open and closed positions for controlling communication through said passage means, a pressure responsive device having oppositely directed like pressure areas for controlling said valve element, means for subjecting one of said like pressure areas of said last mentioned pressure responsive device to cabin pressure, means for connecting the other of said like pressure areas of said last mentioned pressure responsive device in restricted communication with the cabin, said last mentioned pressure area having means forming a delay tank associated therewith and the volume of said tank and the restriction of said communication being predetermined to prevent close following of rapid cabin pressure variation by the pressure acting on said last mentioned pressure area, and means, having a control element movable at the will of an operator, for yieldingly urging said valve element toward its closed position with a force—uniform irrespective of altitude changes—requiring an increased differential between the pressures acting on said like pressure areas to effect opening movement of said valve element.

7. A valve mechanism for controlling the pressures in the cabin of an aircraft to which air is supplied continuously comprising, in combination, a valve member for controlling communication between the cabin and the exterior of the latter, a pressure responsive device having oppositely directed pressure areas for controlling said valve member, means for subjecting one of said pressure areas to cabin pressures, means for connecting the space adjacent the other of said pressure areas in communication with the cabin, passage means for connecting the space adjacent said other pressure area in communication with the exterior of the cabin, means including a valve element movable to open and closed positions for controlling communication through said passage means, a pressure responsive device having oppositely directed like pressure areas for controlling said valve element, means for subjecting one of said like pressure areas of said last mentioned pressure responsive device to cabin pressure, means for connecting the other of said like pressure areas of said last mentioned pressure responsive device in restricted communication with the cabin, said last mentioned pressure area having means forming a delay tank associated therewith and the volume of said tank and the restriction of said communication being predetermined to prevent close following of rapid cabin pressure variation by the pressure acting on said last mentioned pressure area, and means adjustable manually for selectively yieldingly urging said valve element toward its open or closed positions.

8. A valve mechanism for controlling the pressures in the cabin of an aircraft to which air is supplied continuously comprising, in combination, a valve member for controlling communication between the cabin and the exterior of the latter, a pressure responsive device having oppositely directed pressure areas for controlling said valve member, means for subjecting one of said pressure areas to cabin pressures, means for connecting the space adjacent the other of said pressure areas in communication with the cabin, passage means for connecting the space adjacent said other pressure area in communication with the exterior of the cabin, means including a valve element movable to open and closed positions for controlling communication through said passage means, means adjustable manually for yieldingly urging said valve element toward its open or closed positions, a pressure responsive device having oppositely directed pressure areas for controlling said valve element, means subjecting one pressure area of said last mentioned pressure responsive device to cabin pressure for urging said valve element toward its open position, means for connecting the other pressure area of said last mentioned pressure responsive device in restricted communication with the cabin, and means for controlling communication through said last mentioned means including an evacuated bellows and a valve member operatively connected thereto.

9. A valve mechanism for controlling the pressures in the cabin of an aircraft to which air is supplied continuously comprising, in combination, a valve member for controlling communication between the cabin and the exterior of the latter, a pressure responsive device having oppositely directed pressure areas for controlling said valve member, means for subjecting one of said pressure areas to cabin pressures, means for connecting the space adjacent the other of said pressure areas in communication with the cabin, passage means for connecting the space adjacent said other pressure area in communication with the exterior of the cabin, means including a valve element movable to open and closed positions for controlling communication through said passage means, means adjustable manually for selectively yieldingly urging said valve element toward its open or closed positions, a pressure responsive device having oppositely directed pressure areas for controlling said valve element, means subjecting one pressure area of said last mentioned pressure responsive device to cabin pressure for urging said valve element toward its open position, means for connecting the other pressure area of said last mentioned pressure responsive device in restricted communication with the cabin, means for controlling communication through said last mentioned means including an evacuated bellows and a valve member operatively connected thereto, and means adjustable at will for holding said last mentioned valve member in a position which permits continuous restricted communication with the cabin.

10. A valve mechanism for controlling the pressures in the cabin of an aircraft to which air is supplied continuously comprising, in combination, a valve member for controlling communication between the cabin and the exterior of the latter, a bellows device for controlling said valve member, means for subjecting the exterior of said bellows device to cabin pressures, means for connecting the interior of said bellows device in communication with the cabin, passage means for connecting the interior of said bellows device in communication with the exterior of the cabin, means including a valve element movable to open and closed positions for controlling communication through said passage means, a bellows device for controlling said valve element, means for subjecting the exterior of said last mentioned bellows device to cabin pressure, means for connecting the interior of said last mentioned bellows device in restricted communication with the cabin, a valve for controlling communication through said last mentioned means, and an evacuated bellows for controlling said valve.

11. A valve mechanism for controlling the pressures in the cabin of an aircraft to which air is supplied continuously comprising, in combination, a valve member for controlling communication between the cabin and the exterior of the latter, a bellows device for controlling said valve member, means for subjecting the exterior of said bellows device to cabin pressures, means for connecting the interior of said bellows device in communication with the cabin, passage means for connecting the interior of said bellows device in communication with the exterior of the cabin, means including a valve element movable to open and closed positions for controlling communication through said passage means, a bellows device for controlling said valve element, means for subjecting the exterior of said last mentioned bellows device to cabin pressure, means for connecting the interior of said last mentioned bellows device in restricted communication with the cabin, a valve for controlling communication through said last mentioned means, an evacuated bellows for controlling said valve, and means adjustable manually for moving said valve to and holding it in its open position.

12. A valve mechanism for controlling the pressures in the cabin of an aircraft to which air is supplied continuously comprising, in combination, a valve member for controlling communication between the cabin and the exterior of the latter, a bellows device for controlling said valve member, means for subjecting the exterior of said bellows device to cabin pressures, means for connecting the interior of said bellows device in communication with the cabin, passage means for connecting the interior of said bellows device in communication with the exterior of the cabin, means including a valve element movable to open and closed positions for controlling communication through said passage means, a bellows device operatively connected to said valve element, said last mentioned bellows device operating normally to hold said valve element in its closed position, means for subjecting the exterior of said last mentioned bellows device to cabin pressures, and means for connecting the interior of said last mentioned bellows device in restricted communication with the cabin having an absolute pressure responsive control and an overriding control.

13. A valve mechanism for controlling the pressures in the cabin of an aircraft to which air is supplied continuously comprising, in combination, a valve member for controlling communication between the cabin and the exterior of the latter, a bellows device for controlling said valve member, means for subjecting the exterior of said bellows device to cabin pressures, means for connecting the interior of said bellows device in communication with the cabin, passage means for connecting the interior of said bellows device in communication with the exterior of the cabin, means including a valve element movable to open and closed positions for controlling communication through said passage means, a hollow bellows device operatively connected to said valve element, means for subjecting the exterior of said last mentioned bellows device to cabin pressures, means for connecting the interior of said last mentioned bellows device in restricted communication with the cabin, and means rendered effective at will and while at least one end of said bellows remains stationary for yieldingly urging said valve element toward its open position.

14. A valve mechanism for controlling the pressures in the cabin of an aircraft to which air is supplied continuously comprising, in combination, a valve member for controlling communication between the cabin and the exterior of the latter, a bellows device for controlling said valve member, means for subjecting the exterior of said bellows device to cabin pressures, means for connecting the interior of said bellows device in communication with the cabin, passage means for connecting the interior of said bellows device in communication with the exterior of the cabin, means including a valve element movable to open and closed positions for controlling communication through said passage means, a hollow bellows device operatively connected to said valve element, means for subjecting the exterior of said last mentioned bellows device to cabin pressures, means for connecting the interior of said last mentioned bellows device in restricted communication with the cabin, and means rendered effective at will and while at least one end of said bellows device remains stationary for yieldingly urging said valve element towards its closed position with a force which is uniform irrespective of changes in flight altitude.

15. A valve mechanism for controlling the pressures in the cabin of an aircraft to which air is supplied continuously comprising, in combination, a valve member for controlling communication between the cabin and the exterior of the latter, a bellows device for controlling said valve member, means for subjecting the exterior of said bellows device to cabin pressures, means for connecting the interior of said bellows device in communication with the cabin, passage means for connecting the interior of said bellows device in communication with the exterior of the cabin, means including a valve element movable to open and closed positions for controlling communication through said passage means, a bellows device operatively connected to said valve element, means for subjecting the exterior of said last mentioned bellows device to cabin pressures, means associated with said bellows device for forming a chamber of substantial volume in communication with the interior thereof, means for connecting said chamber and the interior of said last mentioned bellows device in restricted communication with the cabin, and means adjustable manually for yieldingly urging said valve element selectively toward its open or closed positions.

16. A valve mechanism for controlling the pressures in the cabin of an aircraft to which air is supplied continuously comprising, in combination, a valve member for controlling communication between the cabin and the exterior of the latter, a bellows device for controlling said valve member, means for subjecting the exterior of said bellows device to cabin pressures, means for connecting the interior of said bellows device in communication with the cabin, passage means for connecting the interior of said bellows device in communication with the exterior of the cabin, means including a valve element movable to open and closed positions for controlling communication through said passage means, a bellows device operatively connected to said valve element, means adjustable manually for yieldingly urging said valve element toward its open or closed positions, means for subjecting the exterior of said last mentioned bellows device to cabin pressure, means for connecting the interior of said last mentioned bellows device in restricted communication with the cabin, a valve for controlling communication through said last mentioned means, and means including an evacuated bellows for controlling said valve.

17. A valve mechanism for controlling the pressures in the cabin of an aircraft to which air is supplied continuously comprising, in combination, a valve member for controlling communication between the cabin and the exterior of the latter, a pressure responsive device having oppositely directed pressure areas for controlling said valve member, means for subjecting one of said pressure areas to cabin pressure, means for subjecting the other of said areas to a variable pressure in the range between cabin pressure and ambient pressure including a valve element variations in the position of which control such variable pressure, a pressure responsive device having oppositely directed pressure areas for controlling said valve element, means for subjecting one pressure area of said last mentioned pressure responsive device to cabin pressure, means for connecting the other pressure area of said last mentioned pressure responsive device in restricted communication with the cabin, and means for controlling communication through said last mentioned means, said communication-controlling means including an evacuated bellows subjected to cabin pressure and having a valve member operatively connected thereto.

18. A valve mechanism for controlling the pressures in the cabin of an aircraft to which air is supplied continuously comprising, in combination, a valve member for controlling communication between the cabin and the exterior of the latter, a pressure responsive device having oppositely directed pressure areas for controlling said valve member, means for subjecting one of said pressure areas to cabin pressure, means for subjecting the other of said areas to a variable pressure in the range between cabin pressure and ambient pressure including a valve element variations in the position of which control such variable pressure, a pressure responsive device having oppositely directed pressure areas for controlling said valve element, mans for subjecting one pressure area of said last mentioned pressure responsive device to cabin pressure, means forming a chamber of substantial volume in communication with the other pressure area of said last mentioned pressure responsive device, means for connecting said chamber in restricted communication with the cabin, and means for controlling communication through said last mentioned means, said controlling means including an evacuated bellows subjected to cabin pressure and having a valve member operatively connected thereto.

19. A valve mechanism for controlling the pressures in the cabin of an aircraft to which air is supplied continuously comprising, in combination, a valve member for controlling communication between the cabin and the exterior of the latter, a pressure responsive device having oppositely directed pressure areas for controlling said valve member, means for subjecting one of said pressure areas to cabin pressure, means for subjecting the other of said areas to a variable pressure in the range between cabin pressure and ambient pressure including a valve element variations in the position of which control such variable pressure, means for yieldingly urging said valve element toward its open position, a pressure responsive device having oppositely directed pressure areas for controlling said valve element, means subjecting one pressure area of said last mentioned pressure responsive device to cabin pressure for urging said valve element toward its open position, means for connecting the other pressure area of said last mentioned pressure responsive device in restricted communication with the cabin, and means for controlling communication through said last mentioned means, said controlling means including an evacuated bellows subjected to cabin pressure and having a valve member operatively connected thereto.

20. A valve mechanism for controlling the pressures in the cabin of an aircraft to which air is supplied continuously comprising, in combination, a valve member for controlling communication between the cabin and the exterior of the latter, a pressure responsive device having oppositely directed pressure areas for controlling said valve member, means for subjecting one of said pressure areas to cabin pressure, means for subjecting the other of said areas to a variable pressure in the range between cabin pressure and ambient pressure including a valve element variations in the position of which control such variable pressure, a pressure responsive device having oppositely directed pressure areas for controlling said valve element, means subjecting one pressure area of said last mentioned pressure responsive device to cabin pressure for urging said valve element toward its open position, means forming a chamber of substantial volume in communication with the other pressure area of said last mentioned pressure responsive device, means for connecting said chamber in restricted communication with the cabin, and means for controlling communication through said last mentioned means, said controlling means including an evacuated bellows subjected to cabin pressure and having a valve member operatively connected thereto.

21. A valve mechanism for controlling the pressures in the cabin of an aircraft to which air is supplied continuously comprising, in combination, a valve member for controlling communication between the cabin and the exterior of the latter, a pressure responsive device having oppositely directed pressure areas for controlling said valve member, means for subjecting one of said pressure areas to cabin pressure, means for subjecting the other of said areas to a variable pressure in the range between cabin pressure and ambient pressure including a valve element variations in the position of which control such variable pressure, means adjustable manually for selectively yieldingly urging said valve element in opposite directions, a pressure responsive device having oppositely directed pressure areas for controlling said valve element, means subjecting one pressure area of said last mentioned pressure responsive device to cabin pressure for urging said valve element in one direction, means for connecting the other pressure area of said last mentioned pressure responsive device in restricted communication with the cabin, means for controlling communication through said last mentioned means including an evacuated bellows and a valve member operatively connected thereto, and means adjustable at will for holding said last mentioned valve member in a position which permits continuous restricted communication with the cabin.

22. A valve mechanism for controlling the pressures in the cabin of an aircraft to which air is supplied continuously comprising, in combination, a valve member for controlling communication between the cabin and the exterior of the latter, a bellows device for controlling said valve member, means for subjecting the exterior of said bellows device to cabin pressures, means for subjecting the interior of said bellows device to a variable pressure in the range between cabin pressure and ambient pressure including a valve element variations in the position of which control such variable pressure, a bellows device for controlling said valve element, means for subjecting the exterior of said last mentioned bellows device to cabin pressure, means for connecting the interior of said last mentioned bellows device in restricted communication with the cabin, a valve for controlling communication through said last mentioned means, and an evacuated bellows for controlling said valve.

WIN W. PAGET.

REFERENCES CITED

The following references are of record in the file of this patent:

UNITED STATES PATENTS

| Number | Name | Date |
|---|---|---|
| 2,307,199 | Cooper | Jan. 5, 1943 |
| 2,342,220 | Price | Feb. 22, 1944 |
| 2,391,197 | Schwein | Dec. 18, 1945 |
| 2,396,116 | Noxon | Mar. 5, 1946 |
| 2,419,707 | Cooper et al. | Apr. 29, 1947 |

FOREIGN PATENTS

| Number | Country | Date |
|---|---|---|
| 521,623 | Great Britain | May 27, 1940 |